(12) United States Patent
Sung et al.

(10) Patent No.: US 12,223,426 B2
(45) Date of Patent: Feb. 11, 2025

(54) METHOD AND APPARATUS FOR DESIGNING AND TESTING AUDIO CODEC BY USING WHITE NOISE MODELING

(71) Applicants:ELECTRONICS AND TELECOMMUNICATIONS RESEARCH INSTITUTE, Daejeon (KR); YONSEI UNIVERSITY WONJU INDUSTRY-ACADEMIC COOPERATION FOUNDATION, Wonju-si (KR)

(72) Inventors: Jongmo Sung, Daejeon (KR); Seung Kwon Beack, Daejeon (KR); Tae Jin Lee, Daejeon (KR); Woo-taek Lim, Daejeon (KR); Inseon Jang, Daejeon (KR); Byeongho Cho, Daejeon (KR); Young Cheol Park, Wonju-si (KR); Joon Byun, Wonju-si (KR); Seungmin Shin, Wonju-si (KR)

(73) Assignees: ELECTRONICS AND TELECOMMUNICATIONS RESEARCH INSTITUTE, Daejeon (KR); YONSEI UNIVERSITY WONJU INDUSTRY-ACADEMIC COOPERATION FOUNDATION, Wonju-si (KR)

( * ) Notice: Subject to any disclaimer, the term of this patent is extended or adjusted under 35 U.S.C. 154(b) by 133 days.

(21) Appl. No.: 18/166,407

(22) Filed: Feb. 8, 2023

(65) Prior Publication Data

US 2023/0274141 A1 Aug. 31, 2023

(30) Foreign Application Priority Data

Feb. 25, 2022 (KR) .......................... 10-2022-0025344

(51) Int. Cl.
*G10L 19/00* (2013.01)
*G06N 3/08* (2023.01)
(Continued)

(52) U.S. Cl.
CPC .............. *G06N 3/08* (2013.01); *G10L 19/028* (2013.01); *G10L 19/038* (2013.01); *G10L 25/30* (2013.01);
(Continued)

(58) Field of Classification Search
CPC ......... G10L 19/00; G10L 19/22; G10L 15/00; G06N 3/084
See application file for complete search history.

(56) References Cited

U.S. PATENT DOCUMENTS 10,733,999 B2   8/2020  Dick
2008/0004869 A1* 1/2008 Herre ...................... G10L 19/22
                                                       704/211

(Continued)

OTHER PUBLICATIONS

Paliwal, et al. "Speech-Signal-Based Frequency Warping," IEEE Signal Pros. Letters, Apr. 2009. (Year: 2009).*

(Continued)

*Primary Examiner* — Feng-Tzer Tzeng

(57) ABSTRACT

Provided is a method and apparatus for designing and testing an audio codec using quantization based on white noise modeling. A neural network-based audio encoder design method includes generating a quantized latent vector and a reconstructed signal corresponding to an input signal by using a white noise modeling-based quantization process, computing a total loss for training a neural network-based audio codec, based on the input signal, the reconstruction signal, and the quantized latent vector, training the neural network-based audio codec by using the total loss, and
(Continued)

validating the trained neural network-based audio codec to select the best neural network-based audio codec.

12 Claims, 9 Drawing Sheets

(51) Int. Cl.
G10L 19/028 (2013.01)
G10L 19/038 (2013.01)
G10L 25/30 (2013.01)
G10L 25/60 (2013.01)
G10L 25/69 (2013.01)
G06N 3/084 (2023.01)
G10L 15/00 (2013.01)
G10L 19/22 (2013.01)

(52) U.S. Cl.
CPC .............. *G10L 25/60* (2013.01); *G10L 25/69* (2013.01); *G06N 3/084* (2013.01); *G10L 15/00* (2013.01); *G10L 19/00* (2013.01); *G10L 19/22* (2013.01)

(56) References Cited

U.S. PATENT DOCUMENTS

2016/0284345 A1* 9/2016 Ji .......................... G06F 16/61
2020/0111501 A1 4/2020 Sung
2021/0082444 A1* 3/2021 Fejgin ................... G10L 19/022
2021/0142812 A1 5/2021 Kim
2021/0174815 A1* 6/2021 Beack ..................... G06N 3/045

OTHER PUBLICATIONS

Paliwal, et al. "Speech-Signal-Based Frequency Warping," IEEE Signal Pros. Letters, Apr. 2009. (Year: 2009)—see previous Office action attachment. (Year: 2009).*

Seungmin Shin et al., "Deep Neural Network (DNN) Audio Coder Using a Perceptually Improved Training Method," 2022 IEEE International Conference on Acoustics, Speech and Signal Processing (ICASSP), 2022.

Johannes Balle et al., "End-to-end optimization of nonlinear transform codes for perceptual quality," 2016 Picture Coding Symposium (PCS), 2016.

Eirikur Agustsson et al., "Soft-to-Hard Vector Quantization for End-to-End Learning Compressible Representations," Proceedings of the 31st Conference on Neural Information Processing Systems (NIPS 2017), 2017.

Srihari Kankanahalli, "End-To-End Optimized Speech Coding With Deep Neural Networks," 2018 IEEE International Conference on Acoustics, Speech and Signal Processing (ICASSP), 2018.

* cited by examiner

METHOD AND APPARATUS FOR DESIGNING AND TESTING AUDIO CODEC BY USING WHITE NOISE MODELING

CROSS-REFERENCE TO RELATED APPLICATION

This application claims the benefit of Korean Patent Application No. 10-2022-0025344 filed on Feb. 25, 2022, in the Korean Intellectual Property Office, the entire disclosure of which is incorporated herein by reference for all purposes.

BACKGROUND

1. Field of the Invention

One or more example embodiments relate to designing and generating a neural network-based audio codec, and more specifically, to a method and apparatus for designing a neural network-based audio codec by using white noise modeling.

2. Description of the Related Art

Recently, a deep neural network-based codec for compression and decompression of speech and audio signal has been designed.

A speech and audio codec based on a neural network may include a quantization process, which is generally not differentiable. Some of conventional neural network-based speech and audio codecs adopt a softmax quantizer to approximate a non-differentiable quantization to a differential process which is possible to train the codecs using error back-propagation.

However, a network training process using the softmax quantizer requires a soft-to-hard annealing process and an additional quantization penalty loss needed to favor softmax approximation close to one-hot vector besides entropy-related loss, so optimization of overall loss including the other losses term as well as the entropy-related loss term for training deep neural networks is directly/indirectly affected.

Accordingly, a method of designing a neural network-based audio codec, which does not adopt a softmax quantizer, is required.

SUMMARY

Example embodiments provide an efficient and intuitive method and apparatus for designing a neural network-based audio codec by using a white noise modeling method as an approximated quantization process.

According to an aspect, there is provided a method of designing a neural network-based audio codec, the method including generating a quantized latent vector from an input signal by using a white noise modeling-based quantization process and generating a reconstructed signal corresponding to an input signal, computing a total loss using the input signal, the reconstructed signal, and the quantized latent vector, training the neural network-based audio codec by using the total loss, and validating the neural network-based audio codec by evaluating the trained neural network.

The generating of the reconstructed signal of the method of designing the neural network-based audio codec according to an example embodiment may include generating a latent vector by feeding an input signal into an encoder of the neural network-based audio codec, quantizing the latent vector resulting from the encoder by using white noise modeling, and generating a reconstructed signal for the input signal by feeding the quantized latent vector into a decoder of the neural network-based audio codec.

The quantizing of the method of designing the neural network-based audio codec may include warping the latent vector to constrain each element of the latent vector within a predetermined range, adding random noise vector corresponding to quantization noise to the warped latent vector, and de-warping the noisy latent vector to output the quantized latent vector.

Both distribution and range of the generated random noise of the method of designing the neural network-based audio codec may be determined depending on quantization step of the neural network-based audio codec.

The computing of the total loss of the method of designing the neural network-based audio codec may include computing the total loss by using at least one of a reconstruction loss term such as mean squared error (MSE) between the input signal and the reconstructed signal, a bit-rate control loss term determined from an entropy of the quantized latent vector, and a perceptual loss term reflecting human perceptual characteristics.

The training of the neural network of the method of designing the neural network-based audio codec according to an example embodiment may include performing training of the neural network-based audio codec by backpropagating the total loss through the neural network-based audio codec.

The validating of the neural network-based audio codec of the method of designing the neural network-based audio codec may include selecting the trained neural network-based audio codec having the best score of validation scores evaluated for a validation database at each training epoch as the best neural network-based audio codec. The validation score may be a total training loss value or an objective quality score measured for validation database.

According to an aspect, there is provided a method of testing the best neural network-based audio codec, the method including generating a latent vector by feeding an input signal into an encoder of the best neural network-based audio codec, quantizing the latent vector resulting from the encoder using rounding operation to output a quantized latent vector, and generating a reconstructed signal by feeding the quantized latent vector into a decoder of the best neural network-based audio codec.

The quantization of the latent vector of the method of testing the best neural network-based audio codec may include warping the latent vector to constrain each element of the latent vector within a predetermined range, rounding each element of the warped latent vector to the nearest integer multiple of a quantization step, and de-warp the latent vector expressed as the integer vector to output the quantized latent vector.

According to an aspect, there is provided an audio codec design apparatus including an audio codec training device configured to generate a quantized latent vector from an input signal by using a white noise modeling-based quantization process and to generate a reconstructed signal corresponding to an input signal, compute a total loss using the input signal, the reconstructed signal, and the quantized latent vector, and train the neural network-based audio codec by using the total loss, and an audio codec validation device configured to select the best neural network-based audio codec by measuring the validation score for the trained neural network.

The audio codec training device of the audio codec design apparatus may be configured to generate a latent vector by feeding the input signal into an encoder of the neural network-based audio codec, quantize the latent vector resulting from the encoder by using white noise modeling, and generate a reconstructed signal for the input signal by feeding the quantized latent vector into a decoder of the neural network-based audio codec.

The audio codec training device of the audio codec design apparatus may be configured to warp the latent vector to constrain each element of the latent vector within a predetermined range, add random noise vector corresponding to quantization noise to the warped latent vector, and de-warping the noisy latent vector to output the quantized latent vector.

Both distribution and range of the random noise of the neural network-based audio codec design apparatus may be determined depending on quantization step of the neural network-based audio codec.

The audio codec training device of the audio codec design apparatus may be configured to compute the total loss by using at least one of a reconstruction loss term such as an MSE between the input signal and the reconstructed signal, a bit-rate control loss term determined from an entropy of the quantized latent vector, and a perceptual loss term reflecting human perceptual characteristics.

The audio codec training device of the neural network-based audio codec design apparatus may be configured to perform training of the neural network-based audio codec by backpropagating the total loss through the neural network-based audio codec.

The audio codec validation device of the neural network-based audio codec design apparatus may be configured to select the trained neural network-based audio codec having the best validation score measured in each training epoch as the best neural network-based audio codec. The validation score at each training epoch may be a total loss value or an objective quality score such as PESQ (Perceptual Evaluation of Speech Quality) and PEAQ (Perceptual Evaluation of Audio Quality) measured for validation database.

A neural network-based audio codec testing device according to an example embodiment may include an model loader configured to load the best neural network-based audio codec from the neural network-based audio codec design apparatus, and a processor configured to generate a latent vector by feeding an input signal into an encoder of the best neural network-based audio codec, quantize the latent vector resulting from the encoder using rounding operation, and generate a reconstructed signal by feeding the quantized latent vector into a decoder of the best neural network-based audio codec.

The processor of the neural network-based audio codec testing device according to an example embodiment may be configured to warp the latent vector to constrain each element of the latent vector within a predetermined range, round each element of the warped latent vector to the nearest integer multiple of quantization step, and de-warp the latent vector expressed as the integer vector to output the quantized latent vector.

Additional aspects of example embodiments will be set forth in part in the description which follows and, in part, will be apparent from the description, or may be learned by practice of the disclosure.

According to example embodiments, it is possible to train a neural network-based audio codec more efficiently and to provide more intuitive method without an additional quantization penalty loss term to favor softmax quantization close to one-hot vector as well as a soft-to-hard annealing procedure required in the existing softmax quantizer by adopting a quantization method using the white noise modeling in the field of speech and audio coding.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. A neural network-based audio codec design method according to an example embodiment may be performed by a neural network-based audio codec design apparatus 110 using white noise modeling.

Figure 1:
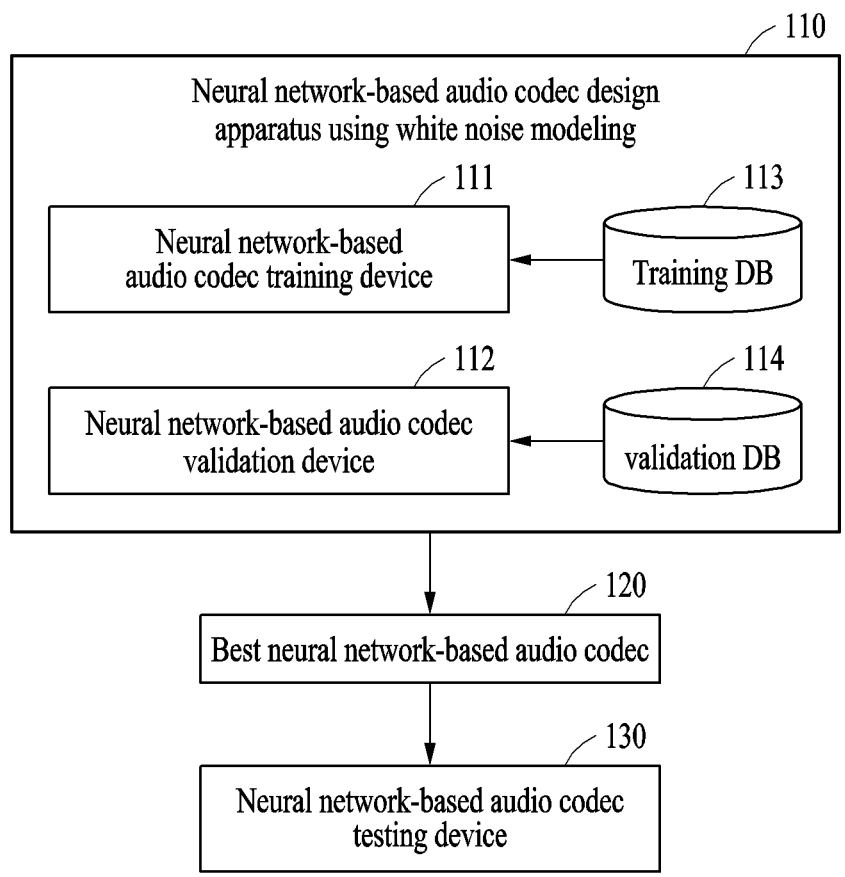
FIG. 1 is a diagram illustrating a neural network-based audio codec design apparatus according to an example embodiment.

FIG. 1 is a diagram illustrating a neural network-based audio codec design apparatus according to an example embodiment.

A neural network-based audio codec design apparatus 110 using white noise modeling may include a neural network-based audio codec training device 111, a neural network-based audio codec validation device 112, a training database (DB) 113, and a validation DB 114, as shown in FIG. 1. In this case, the neural network-based audio codec training device 111 and the neural network-based audio codec validation device 112 may each be a module included in different processors or one processor.

A neural network-based audio codec 120 generated by the neural network-based audio codec design apparatus 110 using white noise modeling may include an encoder, a decoder, and a quantizer.

The neural network-based audio codec training device 111 may use an approximated quantization based on the white noise modeling to quantize a latent vector resulting from the encoder. The latent vector may correspond to a result of encoding an audio signal with a reduced dimension. In this case, the neural network-based audio codec training device 111 may generate a latent vector by feeding a signal stored in the training DB 113 into the encoder of the neural network-based audio codec in batches. In addition, the neural network-based audio codec training device 111 may quantize the latent vector resulting from the encoder of the neural network-based audio codec by using the white noise modeling. In this case, the neural network-based audio codec training device 111 may constrain each element in the vector within a predetermined range by warping the latent vector, and then add a random noise vector corresponding to quantization noise to the warped latent vector to model the quantization process. In addition, the neural network-based audio codec training device 111 may output the quantized latent vector by de-warping the noisy latent vector. In this case, both distribution and range of the random noise for quantization of the latent vector based on white noise modeling may be determined depending on the quantization step. In addition, the neural network-based audio codec training device 111 may generate a reconstructed signal for the input signal by feeding the quantized latent vector into the decoder of the neural network-based audio codec.

Next, the neural network-based audio codec training device 111 may compute the total loss function of the neural network-based audio codec based on the input signal, the reconstructed signal, and the quantized latent vector. In this case, the neural network-based audio codec training device 111 may compute the total loss as the weighted sum of the loss terms selected, according to a design goal, among the reconstruction loss term calculated as the mean squared error (MSE) between the input signal and the reconstructed signal, the bit-rate control loss term calculated as the entropy of the quantized latent vector, and the perceptual loss term reflecting human perceptual characteristics.

Next, the neural network-based audio codec training device 111 may be trained by backpropagating the total loss through the neural network-based audio codec.

The neural network-based audio codec validation device 112 may validate the neural network-based audio codec trained by the neural network-based audio codec training device 111 by using the validation DB 114. In this case, the neural network-based audio codec validation device 112 may generate the quantized latent vector and the reconstructed signal corresponding to the input signal by feeding a signal stored in the verification DB 114 into the neural network-based audio codec trained by the neural network-based audio codec training device 111. In addition, the neural network-based audio codec validation device 112 may calculate a validation score in terms of the total loss or an objective quality score using the input signal, the reconstructed signal, and the quantized latent vector.

Next, the neural network-based audio codec validation device 112 may update the best neural network-based audio codec 120 according to the validation result at every training epoch. In this case, the neural network-based audio codec validation device 112 may compare the validation score evaluated for the validation DB 114 at current epoch with the best validation score. If the current validation score is better than the best validation score stored in the previous epochs, the neural network-based audio codec validation device 112 may store the current neural network-based audio codec trained by the neural network-based audio codec training device 111 and its validation score as the best neural network-based audio codec 120 and the best validation score, respectively. In this case, the validation metric for selection of the best neural network-based audio codec may be determined according to the design goal of the neural network-based audio codec.

The training device and validation device of the neural network-based audio codec iteratively train the neural network-based audio codec and validate the trained neural network-based audio codec to obtain the best neural network-based audio codec having the best validation score over the predetermined training epochs.

In this case, a neural network-based audio codec testing device 130 may test the best neural network-based audio codec 120 determined through training and validation. The neural network-based audio codec testing device 130 may include a model loader, which loads the best neural network-based audio codec 120 from the neural network-based audio codec design apparatus 110, and a processor.

The processor of the neural network-based audio codec testing device 130 may feed the input signal into the encoder of the best neural network-based audio codec 120 to generate a latent vector.

Next, the processor of the neural network-based audio codec testing device 130 may quantize the latent vector resulting from the encoder of the best neural network-based audio codec 120 using rounding operation. Then, the processor of the neural network-based audio codec testing device 130 may generate the reconstructed signal for the input signal by feeding the quantized latent vector into the decoder of the neural network-based audio codec 120.

The neural network-based audio codec design apparatus 110 using white noise modeling may include a quantizer, which is differentiable approximation of general quantization method by using the white noise modeling and may replace the existing softmax quantizer widely used in the conventional neural network-based speech and audio compression field.

The neural network-based audio codec design apparatus 110 using white noise modeling may train the neural network-based audio codec more efficiently and provide more intuitive quantization method without an additional quantization penalty loss term to favor softmax quantization close to the one-hot vector as well as a soft-to-hard annealing procedure required in the existing softmax quantizer, by adopting a quantization method using the white noise modeling in the field of speech and audio coding.

Figure 2:
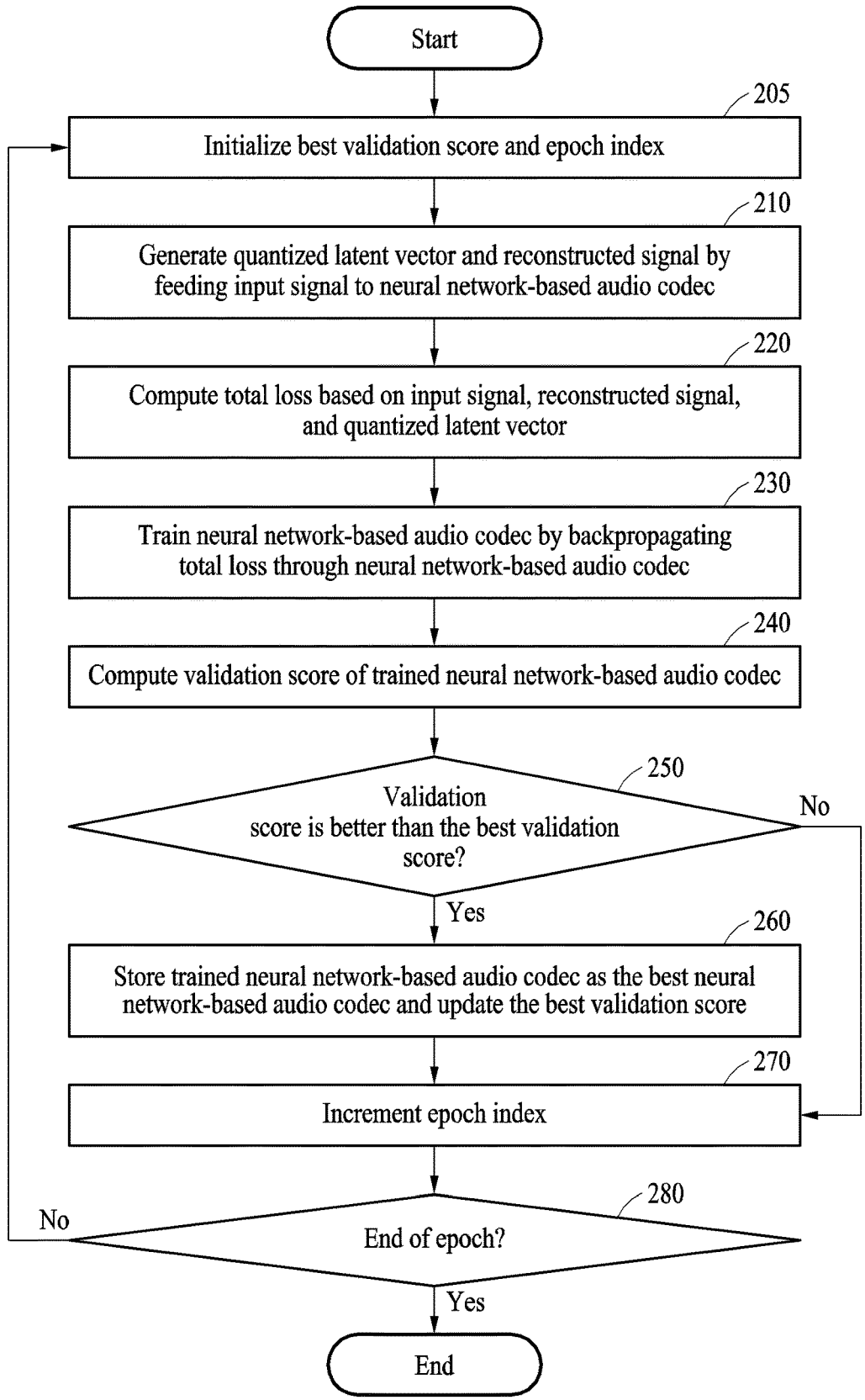
FIG. 2 is a flowchart illustrating a method of designing a neural network-based audio codec, according to an example embodiment.

FIG. 2 is a flowchart illustrating a method of designing a neural network-based audio codec, according to an example embodiment.

In operation 205, the training of the neural network-based audio codec apparatus 100 may initialize the best validation score and training epoch index.

In operation 210, the neural network-based audio codec training device 111 may use a quantization process based on white noise modeling to generate the quantized latent vector and the reconstructed signal corresponding to a signal stored in the training DB 113.

In operation 220, the neural network-based audio codec training device 111 may compute the total loss of the neural network-based audio codec based on the input signal, the reconstructed signal, and the quantized latent vector. In this case, the neural network-based audio codec training device 111 may compute the total loss as the weighted sum of the loss terms selected among the reconstruction loss term calculated as the MSE between the input signal and the reconstructed signal; the bit-rate control loss term calculated as the entropy of the quantized latent vector; and the perceptual loss term reflecting human perceptual characteristics.

In operation 230, the neural network-based audio codec training device 111 may train the neural network-based audio codec by backpropagating the total loss through the neural network-based audio codec.

In operation 240, the neural network-based audio codec validation device 112 may validate the neural network-based audio codec trained by the neural network-based audio codec training device 111. In this case, the neural network-based audio codec validation device 112 may feed a signal stored in the validation DB 114 into the neural network-based audio codec trained in operation 230 to generate the quantized latent vector and the reconstructed signal corresponding to the input signal. In addition, the neural network-based audio codec validation device 112 may calculate a validation score in terms of an objective quality score or the total loss based on the input signal, the reconstructed signal, and the quantized latent vector.

In operation 250, the neural network-based audio codec validation device 112 may determine whether the validation score evaluated for the validation DB 114 is better than the best validation score. In addition, if the validation score is better than the best validation score, the neural network-based audio codec validation device 112 may select the neural network-based audio codec trained in operation 230 as the best neural network-based audio codec, and then may perform operation 260. In addition, if the validation score is not better than the best validation score, the training of the neural network-based audio codec apparatus 110 may increment a training epoch index by 1 in operation 270 and repeat operation 210 to 250.

In operation 260, the neural network-based audio codec validation device 112 may store the neural network-based audio codec trained in operation 230 as the best neural network-based audio codec, and may update the best validation score with the validation score evaluated in operation 240.

In operation 280, the training of the neural network-based audio codec may check whether the training index reaches the predefined number of epochs. If the training index is less than the predefined number of epochs, the training and validation operations stop. Otherwise, the training of the neural network-based audio codec 110 may repeat operations from 210 to 270.

Figure 3:
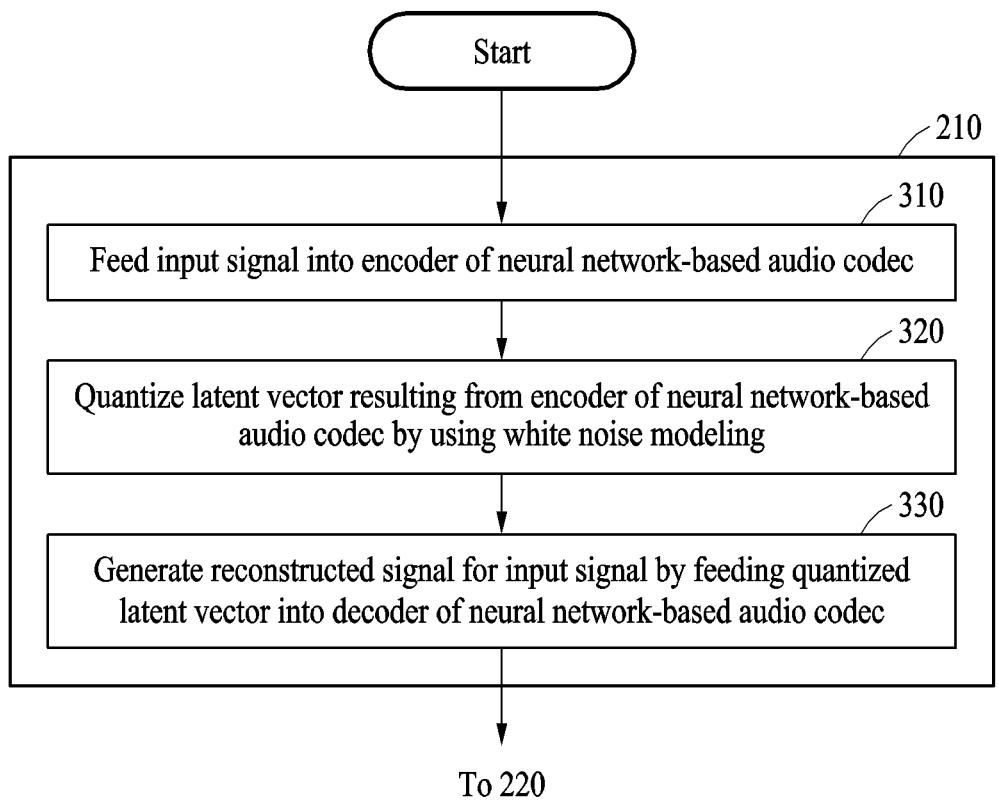
FIG. 3 is a detailed flowchart illustrating a process of encoding, quantization, and decoding by using white noise modeling of a method of designing a neural network-based audio codec, according to an example embodiment.

FIG. 3 is a detailed flowchart illustrating a process of encoding, quantization, and decoding by using white noise modeling of a method of designing a neural network-based audio codec, according to an example embodiment. Operations 310 to 330 may be included in operation 210 of FIG. 2.

In operation 310, the neural network-based audio codec training device 111 may feed the input signal into the encoder of the neural network-based audio codec to generate a latent vector.

In operation 320, the neural network-based audio codec training device 111 may quantize the latent vector based on the white noise modeling to output the quantized latent vector.

In operation 330, the neural network-based audio codec training device 111 may feed the quantized latent vector obtained in operation 320 into the decoder of the neural network-based audio codec to generate the reconstructed signal for the input signal.

Figure 4:
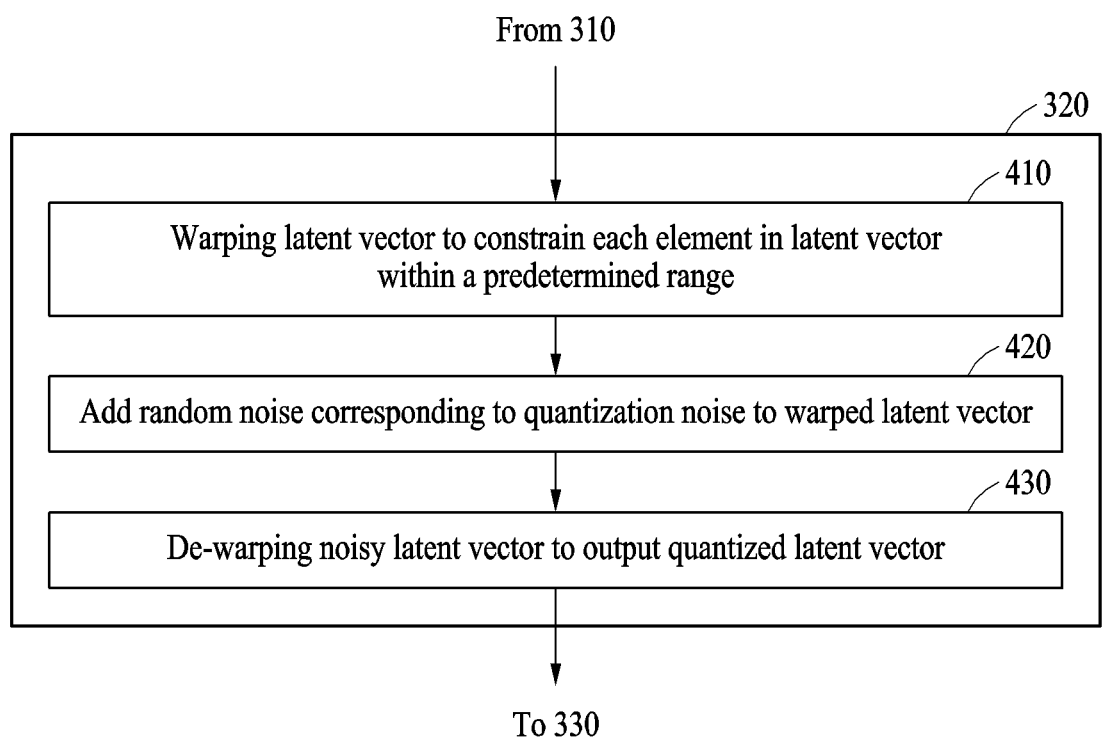
FIG. 4 is a detailed flowchart illustrating a quantization process of a latent vector by using the white noise modeling of FIG. 3.

FIG. 4 is a detailed flowchart illustrating a quantization process of a latent vector by using the white noise modeling of FIG. 3. Operations 410 to 430 may be included in operation 320 of FIG. 3.

In operation 410, the neural network-based audio codec training device 111 may warp the latent vector resulting from the encoder of the neural network-based audio codec to constrain each element in the latent vector within a predetermined range.

In operation 420, the neural network-based audio codec training device 111 may add a random noise vector corresponding to the quantization noise to the latent vector warped in operation 410.

In operation 430, the neural network-based audio codec training device 111 may de-warp the noisy latent vector to which the random noise vector is added in operation 420 to output the quantized latent vector.

Figure 5:
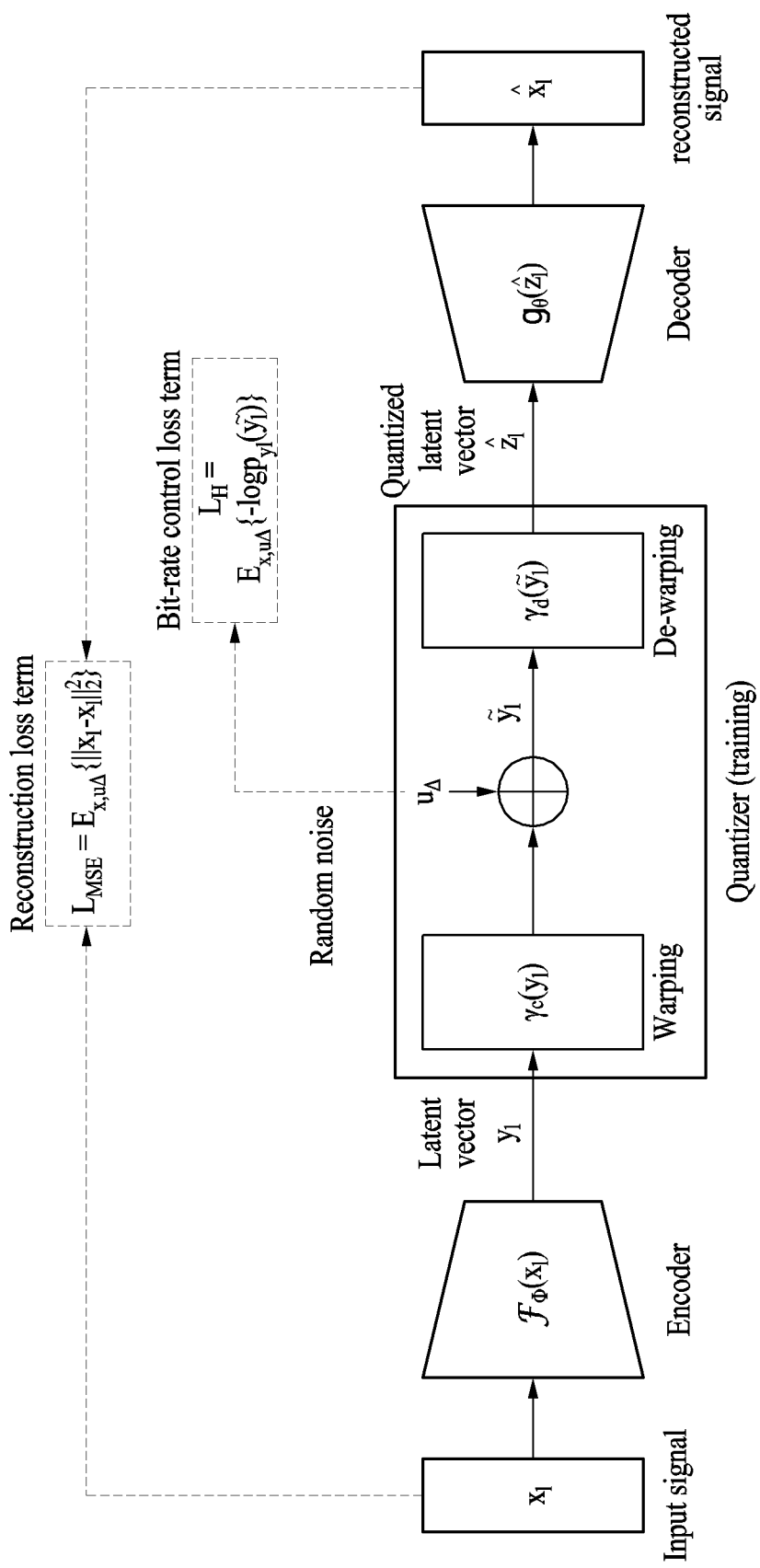
FIG. 5 is a diagram illustrating a process of encoding, quantization, and decoding using white noise modeling of a method of designing a neural network-based audio codec according to an example embodiment.

FIG. 5 is a diagram illustrating a process of encoding, quantization, and decoding using white noise modeling of a method of designing a neural network-based audio codec, according to an example embodiment. As shown in FIG. 5, the neural network-based audio codec may include an encoder, a decoder, and a quantizer. The encoder and the decoder of the neural network-based audio codec may be auto-encoders.

The input signal $x_l$ of the neural network-based audio codec may be a frame vector with a predefined length obtained by windowing, and the windowing may be applied to input signal with an overlapping region to reduce a blocking effect. The subscript l in $x_l$ means a frame index. In addition, the neural network-based audio codec training device 111 may feed the input signal $x_l$ to the encoder into output the latent vector $y_l$. In this case, the latent vector $y_l$ may be expressed as a function of the input signal $x_l$ as in Equation 1.

$$y_l \leftarrow \mathcal{F}_\phi(x_l) \quad \text{[Equation 1]}$$

where, $\mathcal{F}_\phi(\cdot)$ denotes an encoding neural network function in the neural network-based audio codec. The neural network-based audio codec training device 111 may add the random noise generated with a distribution of $$u_\Delta \sim rect\left[-\frac{\Delta}{2}, +\frac{\Delta}{2}\right]$$

to the latent vector $y_l$. The distribution of random noise may be uniform in the range of $-\frac{1}{2}$ to $+\frac{1}{2}$ of the quantization step $\Delta$, to model a quantization noise occurring in the process of quantization of the latent vector. For example, random noise vector generated from uniform distribution in the range of $-\frac{1}{2}$ to $+\frac{1}{2}$ of the quantization step $\Delta$ may be added to the latent vector $y_l$. Such approximated quantization process using white noise modeling is differentiable while general quantization process such as mapping a value to discrete representative value is not differentiable.

As shown in FIG. 5, the neural network-based audio codec training device 111 may constrain each element in the latent vector within the predetermined range by warping the latent vector $y_l$ before adding random noise vector $u_\Delta$. In addition, the neural network-based audio codec training device 111 may add the random noise vector $u_\Delta$ to the warped latent vector $\gamma_c(y_l)$.

In addition, the neural network-based audio codec training device 111 may output the quantized latent vector $\hat{z}_l$ by de-warping the noisy latent vector $\tilde{y}_l$ to which the random noise is added.

Figure 6:
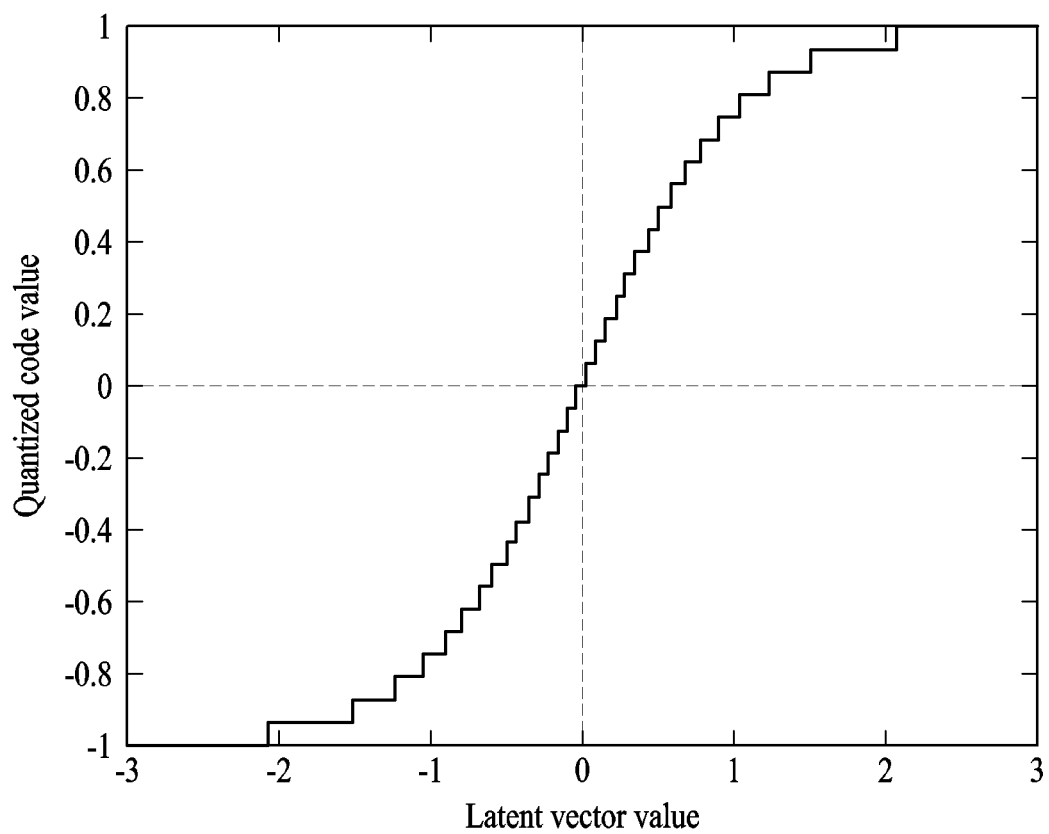
FIG. 6 is an example of mapping a value of element in a latent vector to a code value by warping of a method of designing a neural network-based audio codec, according to an example embodiment.

In this case, the neural network-based audio codec training device 111 may use various functions for warping and de-warping the latent vector. For example, when a hyperbolic tangent (tan h) is used for warping the latent vector and the random noise has uniform distribution, the warped latent vector $\gamma_c(y_l)$, the noisy latent vector $\tilde{y}_l$, and the quantized latent vector $\hat{z}_l$ may be described as Equation 2, Equation 3, and Equation 4, respectively.

$$\gamma_c(y_l) = \tanh(ay_l) \qquad \text{[Equation 2]}$$

$$\tilde{y}_l \leftarrow \gamma_c(y_l) + u_\Delta, u_\Delta \sim rect\left[-\frac{\Delta}{2}, +\frac{\Delta}{2}\right] \qquad \text{[Equation 3]}$$

$$\hat{z}_l \leftarrow \gamma_d(\tilde{y}_l), \gamma_d(\tilde{y}_l) = \frac{1}{a}\tanh^{-1}(b\tilde{y}_l) \qquad \text{[Equation 4]}$$

where, scale factors of a and b may be applied to avoid an excessive saturation in both tails due to tan h function and to prevent each element of the noisy latent vector from being out of [−1.0, 1.0]. In addition, if a 5-bit uniform quantizer having 32 representative values in a regular interval is used for quantization of the warped latent vector and a hyperbolic tangent is used as a warping function, the mapping relationship between the latent vector and the representative value of the uniform quantizer may be shown in FIG. 6. In this case, the quantization step ($\Delta$) may be $\frac{1}{32}$.

In addition, the neural network-based audio codec training device 111 may feed the quantized latent vector $\hat{z}_l$ resulting from the operations described in FIG. 4 into the decoder of the neural network-based audio codec, to output the reconstructed signal for the input signal $x_l$. The reconstructed signal $\hat{x}_l$ may be expressed as the function of the quantized latent vector $\hat{z}_l$ as in Equation 5.

$$\hat{x}_l \leftarrow g_\Theta(\hat{z}_l) \qquad \text{[Equation 5]}$$

where, $\mathcal{G}_\Theta(\cdot)$ denotes a decoding neural network function in the neural network-based audio codec.

In addition, the neural network-based audio codec training device 111 may compute the total loss as the weighted sum of the loss terms selected among the reconstruction loss term calculated as the MSE between the input signal $x_l$ and the reconstructed signal $\hat{x}_l$; the bit-rate control loss term calculated as the entropy of the noisy latent vector $\tilde{y}_l$; and the perceptual loss term reflecting human perceptual characteristics, according to the design goal.

For example, the neural network-based audio codec training device 111 may calculate the reconstruction loss term, $\mathcal{L}_{MSE}$ as MSE in Equation 6.

$$\mathcal{L}_{MSE} = \mathbb{E}_{x,u_\Delta}\{\|x_l - \hat{x}_l\|_2^2\} \qquad \text{[Equation 6]}$$

where, $\mathbb{E}\{\cdot\}$ denotes an expectation of random variable and $\|\cdot\|_2$ denotes an L2-norm.

In addition, the neural network-based audio codec training device 111 may use Equation 7 to calculate the bit-rate control loss term $\mathcal{L}_H$ as the entropy of the noisy latent vector in bits.

$$\mathcal{L}_H = \mathbb{E}_{x,u_\Delta}\{-\log p_{\tilde{y}_l}(\tilde{y}_l)\}, p_{\tilde{y}_l}(\tilde{y}_l) = \Pi_i p_{\tilde{y}_{l,i}}(\tilde{y}_{l,i}) \qquad \text{[Equation 7]}$$

In this case, the neural network-based audio codec training device 111 may estimate the probability distribution of $\tilde{y}_l$, $p_{\tilde{y}_l}(\tilde{y}_l)$ used to calculate the bit-rate control loss term $\mathcal{L}_H$.

In general, if the reconstructed loss term is adopted solely as the total loss term to train a neural network-based audio codec, the resulting neural network-based audio codec may suffer from a poor subjective quality perceived by human and while it may provide a good performance in objective metrics such as signal-to-noise ratio (SNR). To improve the subjective quality, the perceptual loss term $\mathcal{L}_p$, based on human auditory characteristics such as the psychoacoustic model, the masking effect, and the mel-frequency analysis, may be combined with the reconstruction loss term like MSE.

The neural network-based audio codec training device 111 may compute the total loss for training the neural network-based audio codec as the weighted sum of the following three loss terms as in Equation 8.

$$\mathcal{L}_{Total} = \lambda_1 \mathcal{L}_H + \lambda_2 \mathcal{L}_{MSE} + \lambda_3 \mathcal{L}_p) \qquad \text{[Equation 8]}$$

where, $\lambda_1$, $\lambda_2$, and $\lambda_3$ are loss weighting factors, may be determined experimentally depending on design constraints of the neural network-based audio codec.

Figure 7:
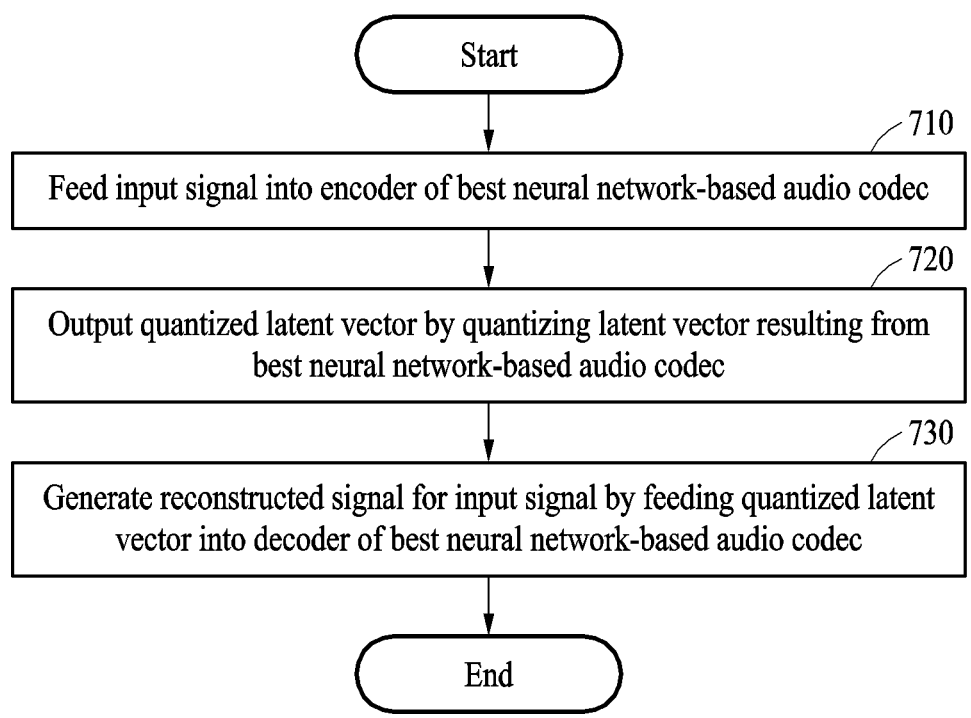
FIG. 7 is a detailed flowchart illustrating a testing process of a neural network-based audio codec according to an example embodiment.

FIG. 7 is a detailed flowchart illustrating a process of encoding, quantization, and decoding in a method of testing a neural network-based audio codec, according to an example embodiment.

In operation 710, the neural network-based audio codec testing device 130 may feed the input signal into the encoder of the best neural network-based audio codec 120 to generate a latent vector.

In operation 720, the neural network-based audio codec testing device 130 may quantize the latent vector resulting from the encoder of the best neural network-based audio codec 120 to generate a quantized latent vector.

In operation 730, the neural network-based audio codec testing device 130 may feed the quantized latent vector to the decoder of the best neural network-based audio codec 120 to generate a reconstructed signal for the input signal.

Figure 8:
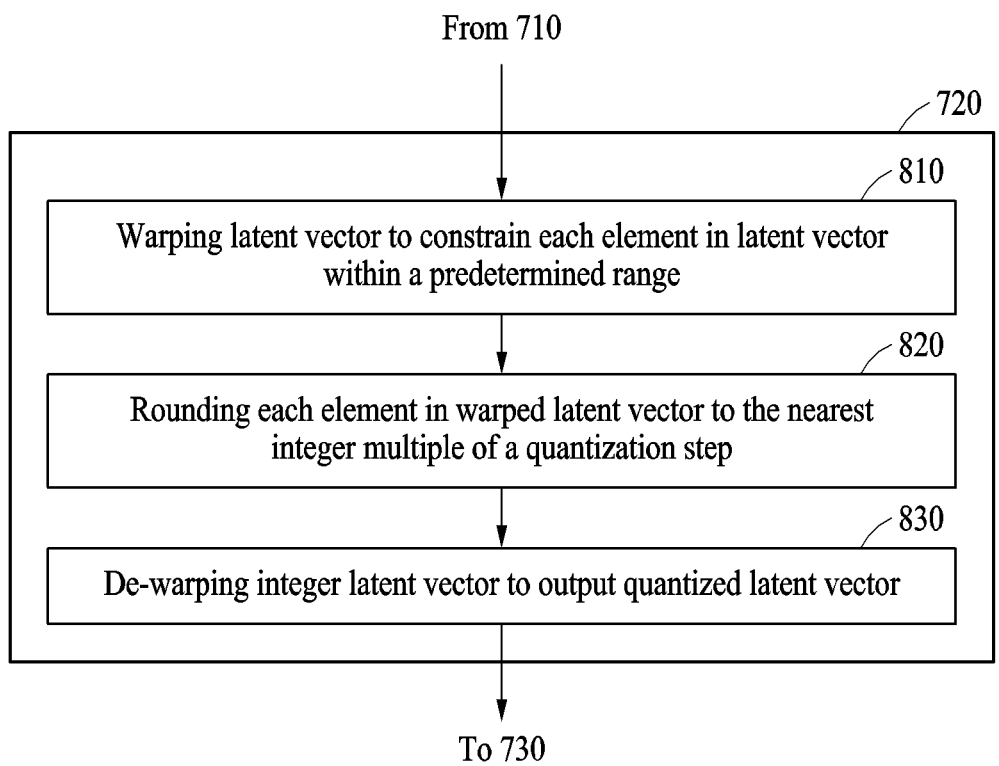
FIG. 8 is a detailed flowchart of a latent vector quantization process of FIG. 7.

FIG. 8 is a detailed flowchart of a latent vector quantization process of FIG. 7. Operations 810 to 830 may be included in operation 720 of FIG. 7.

In operation 810, the neural network-based audio codec testing device 130 may warp the latent vector resulting from the encoder of the best neural network-based audio codec 120 to constrain each element in the latent vector within a predetermined range.

In operation 820, the neural network-based audio codec testing device 130 may round each element of the warped latent vector to the nearest integer multiple of a quantization step.

In operation 830, the neural network-based audio codec testing device 130 may de-warp the latent vector expressed as an integer vector to output a quantized latent vector.

Figure 9:
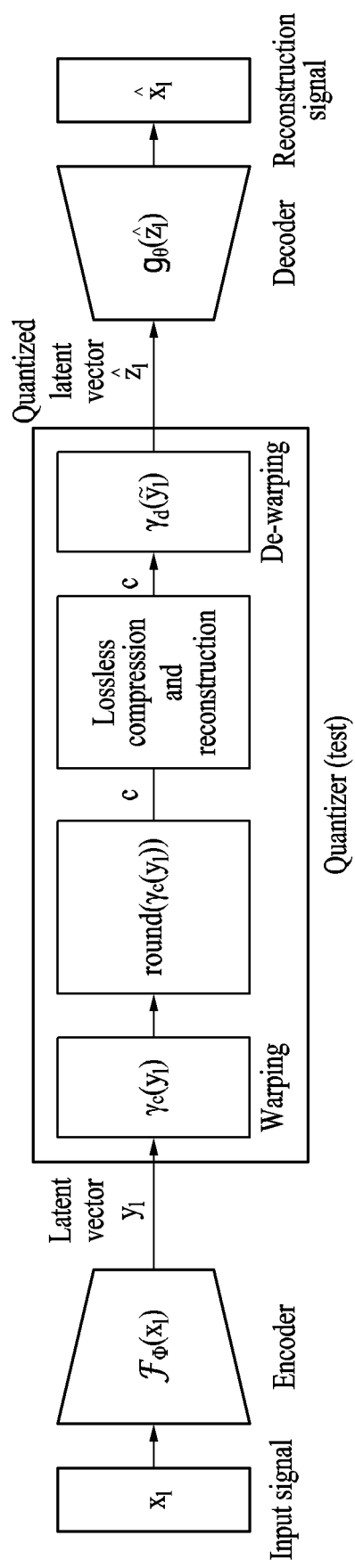
FIG. 9 is a diagram illustrating a process of encoding, quantization, and decoding of a method of testing a neural network-based audio codec according to an example embodiment.

FIG. 9 is a diagram illustrating a process of encoding, quantization, and decoding of a method of testing a neural network-based audio codec, according to an example embodiment. The best neural network-based audio codec 120 may include an encoder, a decoder, and a quantizer as in FIG. 9. In this case, the encoder and the decoder may be the same encoding and decoding functions as Equation 1 and Equation 5 described in the method of training a neural network-based audio codec. In addition, as shown in FIG. 9, the quantizer of the best neural network-based audio codec 120 may generate a quantized latent vector by performing warping, rounding, and de-warping operations on a latent vector resulting from the encoder of the best neural network-based audio codec 120. The warping and de-warping operations may be performed in the same way as Equation 2 and Equation 4. In this case, the best neural network-based audio codec 120 may perform rounding on each element of the warped latent vector to the nearest integer multiple of a quantization step to generate the code vector instead of adding a random noise vector.

$$c = \text{round}(\gamma_c(\mathcal{F}_\phi(x_l))) \quad \text{[Equation 9]}$$

$$\hat{x}_l = \mathcal{G}_\theta(\gamma_d(c)) \quad \text{[Equation 10]}$$

In addition, the code vector c may be converted into the quantized latent vector through de-warping, and then the quantized latent vector may be fed to the decoder of the best neural network-based audio codec 120 to generate a reconstructed signal $\hat{x}_l$ of the original input signal as in Equation 10. In order to efficiently transmit the code vector from encoder to decoder, a lossless compression method based on the probability distribution of the code vector, such as Huffman coding or arithmetic coding, may be used.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of designing a neural network-based audio codec, the method comprising:
   generating a quantized latent vector and a reconstructed signal corresponding to an input signal by using a white noise modeling-based quantization process;
   computing a total loss for training of the neural network-based audio codec, based on the input signal, the reconstructed signal, and the quantized latent vector;
   training the neural network-based audio codec by using the total loss; and
   validating the trained neural network-based audio codec to select the best neural network-based audio codec,
   wherein the computing of the total loss comprises:
      calculating a reconstruction loss term as mean squared error (MSE) between the input signal and the reconstructed signal, a bit-rate control loss term as an entropy of the quantized latent vector, and a perceptual loss term reflecting human perceptual characteristics, respectively; and calculating the total loss by adding the reconstruction loss term, the bit-rate control loss term, and the perceptual loss term, wherein the reconstruction loss term is determined based on a square of an L2-norm of a difference between the input signal and the reconstructed signal, wherein the bit-rate control loss term is determined based on probability distribution for a latent vector with added random noise, wherein the latent vector with added random noise is generated by adding a random noise to a latent vector output from an encoder of the neural network-based audio codec that receives the input signal, and wherein the quantized latent vector is generated by de-warping the latent vector with added random noise.

2. The method of claim 1, wherein the generating of the reconstructed signal and the quantized latent vector comprises:

feeding the input signal into the encoder of the neural network-based audio codec;

quantizing the latent vector resulting from the encoder by using white noise modeling; and generating the reconstructed signal for the input signal by feeding the quantized latent vector into a decoder of the neural network-based audio codec.

3. The method of claim 2, wherein the quantizing of the latent vector comprises:

warping the latent vector to constrain each element in the latent vector within a predetermined range;

adding a random noise vector corresponding to quantization noise to the warped latent vector to generate a noisy latent vector; and de-warping the noisy latent vector to output the quantized latent vector.

4. The method of claim 3, wherein both distribution and range of the generated random noise are determined according to a quantization step of the neural network-based audio codec.

5. The method of claim 1, wherein the training of the neural network comprises performing training of the neural network-based audio codec by backpropagating the total loss through the neural network-based audio codec.

6. The method of claim 1, wherein the validating of the neural network-based audio codec comprises evaluating the trained neural network-based audio codec in terms of validation score as the total loss or objective quality metrics by feeding a signal of a validation database (DB) into the trained neural network-based audio codec, comparing the evaluated validation score with the best validation score, and selecting the trained neural network-based audio codec as the best neural network-based audio codec and updating the best validation score with the evaluated validation score if the evaluated validation score is better than the best validation score.

7. A neural network-based audio codec design apparatus comprising:

an audio codec training device configured to generate a quantized latent vector and a reconstructed signal corresponding to an input signal by using a white noise modeling-based quantization process, compute a total loss for training of a neural network-based audio codec, based on the input signal, the reconstructed signal, and the quantized latent vector, and train the neural network-based audio codec by using the total loss; and an audio codec validation device configured to validate the trained neural network-based audio codec to select the best neural network-based audio codec, wherein the audio codec training device is configured to calculate a reconstruction loss term as mean squared error (MSE) between the input signal and the reconstructed signal, a bit-rate control loss term as an entropy of the quantized latent vector, and a perceptual loss term reflecting human perceptual characteristics, and calculate the total loss by adding the reconstruction loss term, the bit-rate control loss term, and the perceptual loss term, wherein the reconstruction loss term is determined based on a square of an L2-norm of a difference between the input signal and the reconstructed signal, wherein the bit-rate control loss term is determined based on probability distribution for a latent vector with added random noise, wherein the latent vector with added random noise is generated by adding a random noise to a latent vector output from an encoder of the neural network-based audio codec that receives the input signal, and wherein the quantized latent vector is generated by de-warping the latent vector with added random noise.

8. The neural network-based audio codec design apparatus of claim 7, wherein the audio codec training device is configured to feed the input signal into the encoder of the neural network-based audio codec, quantize the latent vector resulting from the encoder by using white noise modeling, and generate the reconstructed signal for the input signal by feeding the quantized latent vector into a decoder of the neural network-based audio codec.

9. The neural network-based audio codec design apparatus of claim 8, wherein the audio codec training device is configured to warp the latent vector to constrain each element in the latent vector within a predetermined range, add a random noise vector corresponding to quantization noise to the warped latent vector to generate a noisy latent vector, and de-warp the noisy latent vector to output the quantized latent vector.

10. The neural network-based audio codec design apparatus of claim 9, wherein both distribution and range of the generated random noise are determined according to a quantization step of the neural network-based audio codec.

11. The neural network-based audio codec design apparatus of claim 7, wherein the audio codec training device is configured to perform training of the neural network-based audio codec by backpropagating the total loss through the neural network-based audio codec.

12. The neural network-based audio codec design apparatus of claim 7, wherein the audio codec validation device is configured to evaluate the trained neural network-based audio codec in terms of validation score as the total loss or objective quality metrics by feeding a signal of a validation database (DB) into the trained neural network-based audio codec, compare the evaluated validation score with the best validation score, and select the trained neural network-based audio codec as the best neural network-based audio codec and update the best validation score with the evaluated validation score if the evaluated validation score is better than the best validation score.

* * * * *